United States Patent [19]

Whitney et al.

[11] 4,418,774
[45] Dec. 6, 1983

[54] WEIGHT OR FORCE MEASURING APPARATUS

[75] Inventors: John A. Whitney; Daniel T. Dwyer; Peter F. Sorenson, all of Fort Wayne, Ind.

[73] Assignee: Franklin Electric Co., Inc., Bluffton, Ind.

[21] Appl. No.: 328,746

[22] Filed: Dec. 8, 1981

[51] Int. Cl.³ .................. G01G 3/14; G01G 21/10
[52] U.S. Cl. .................. 177/210 FP; 177/184; 177/DIG. 6
[58] Field of Search .................. 177/184, 189, 210 FP, 177/226, DIG. 6

[56] References Cited

U.S. PATENT DOCUMENTS

| | | | |
|---|---|---|---|
| 3,712,395 | 1/1973 | Streater et al. | 177/210 FP |
| 3,850,257 | 11/1974 | Teraoka | 177/226 |
| 4,070,900 | 1/1978 | Engels | 177/210 FP X |
| 4,184,555 | 1/1980 | Maltby et al. | 177/189 X |

Primary Examiner—George H. Miller, Jr.
Attorney, Agent, or Firm—Merriam, Marshall & Bicknell

[57] ABSTRACT

This apparatus is for use in measuring a weight, or force, and it is particularly useful as a scale. The apparatus includes a single vibrating wire and wire supports that rigidly clamp the two ends of the wire. A weight to be measured is applied to the wire in substantially the direction of its length, and the applied weight changes the tension in the wire. The apparatus includes a wire drive circuit that causes the wire to vibrate at essentially its natural resonant frequency. The frequency varies as a known cubic equation with respect to the applied weight, and a computer, operating in accordance with the equation, converts the measured frequency to a weight signal. The apparatus further includes vibration dampers and isolators for reducing the effects of sympathetic vibrations and of externally induced vibrations, and means to correct for external influences such as disturbing frequencies and ambient temperature.

10 Claims, 17 Drawing Figures

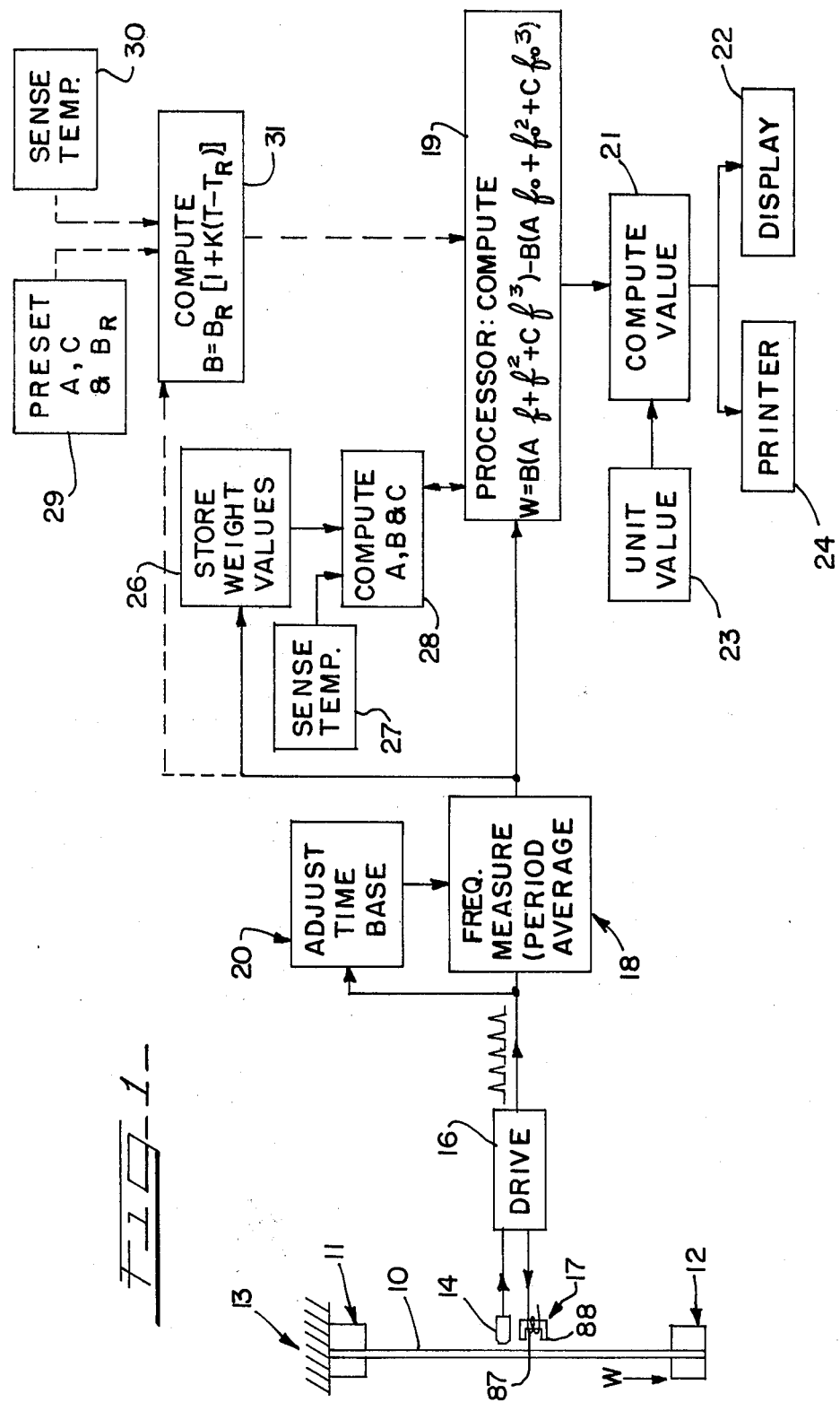

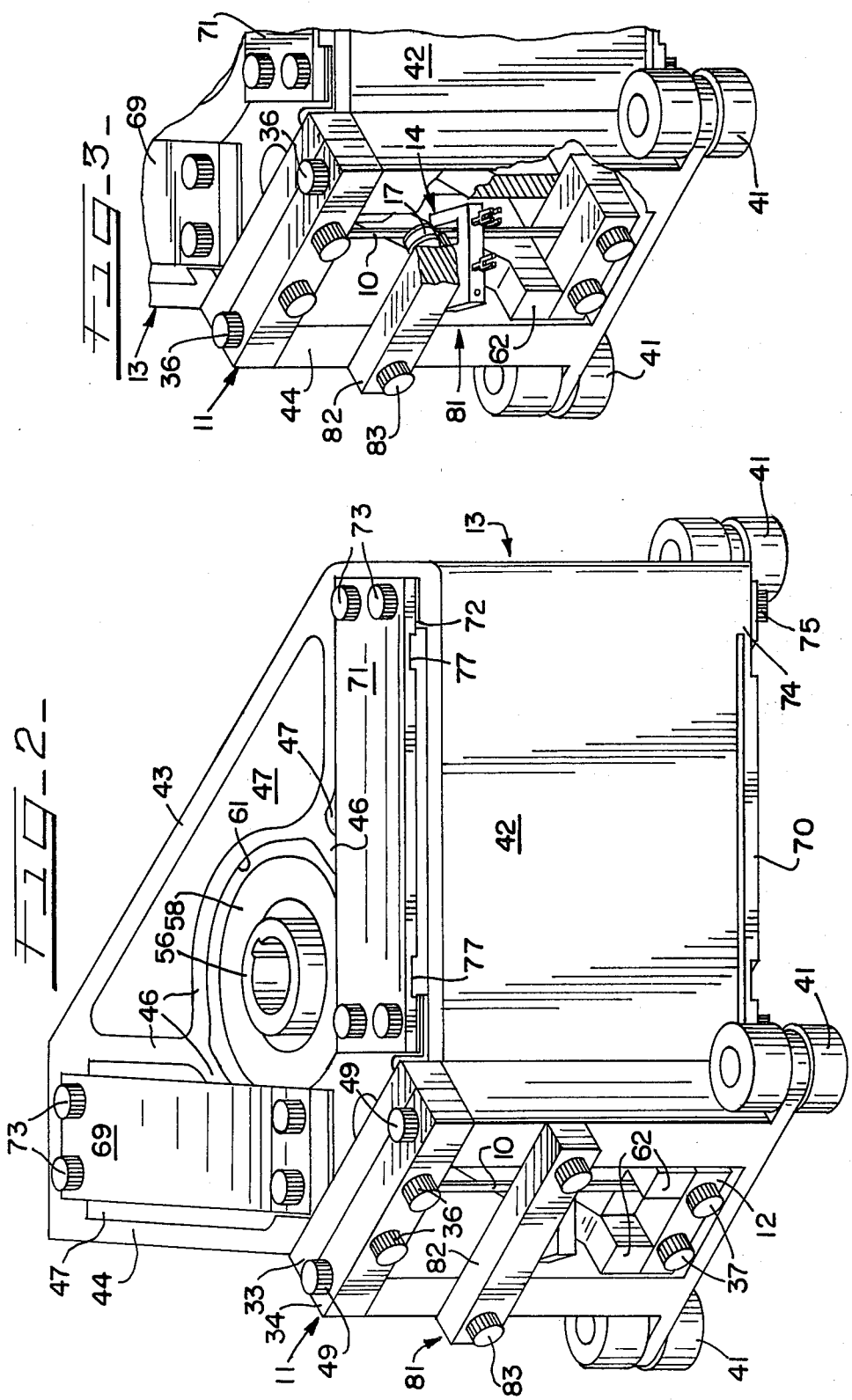

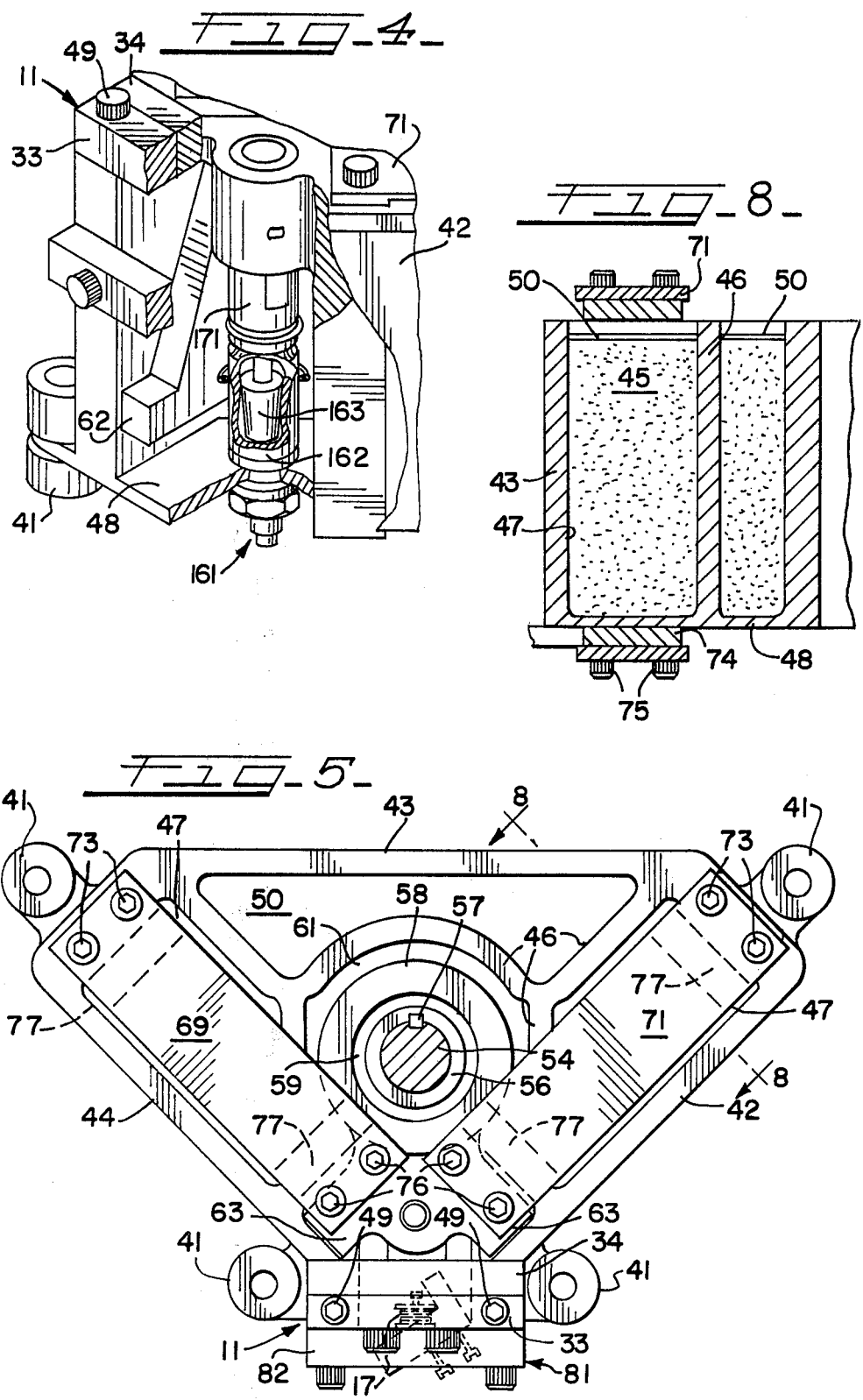

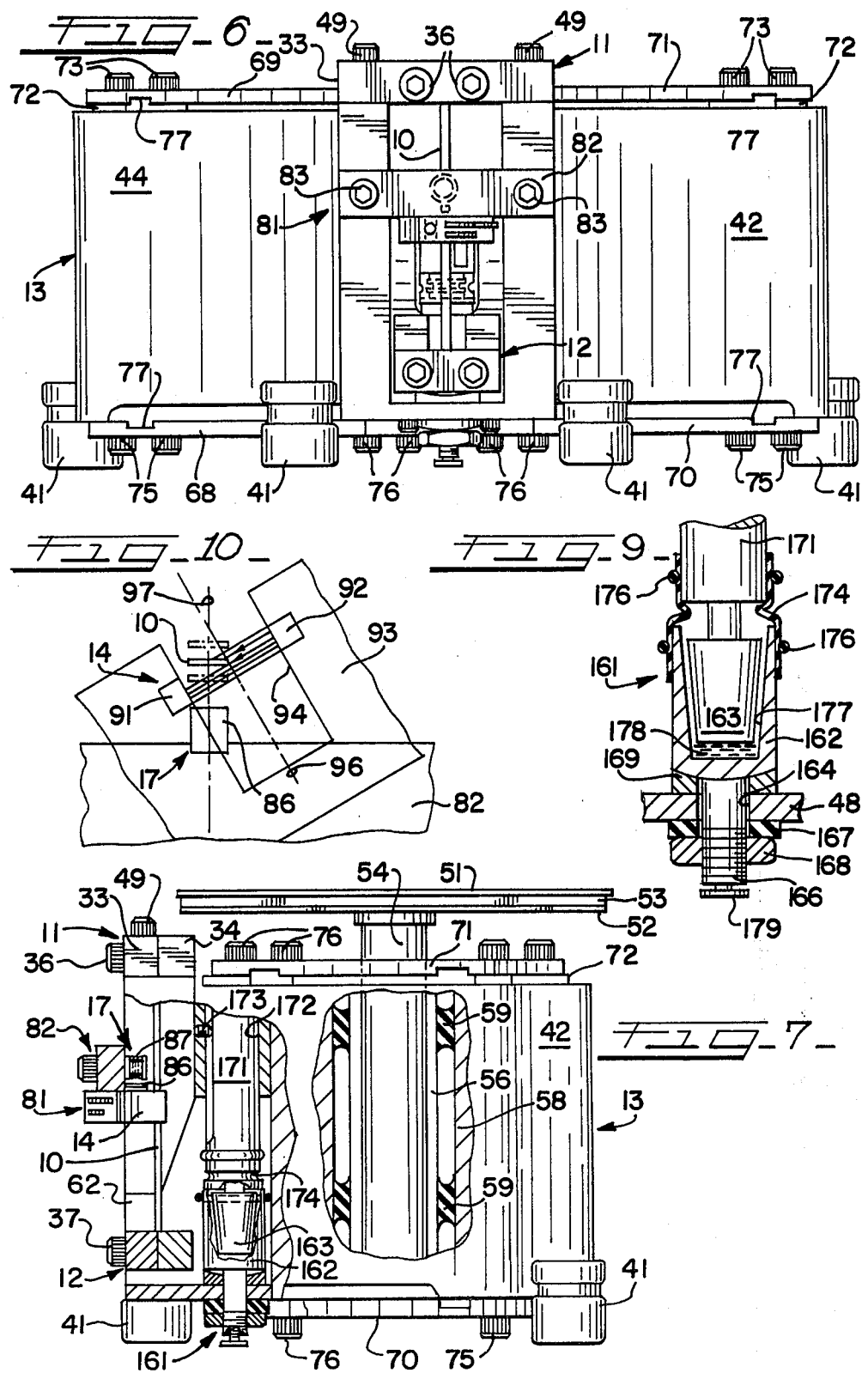

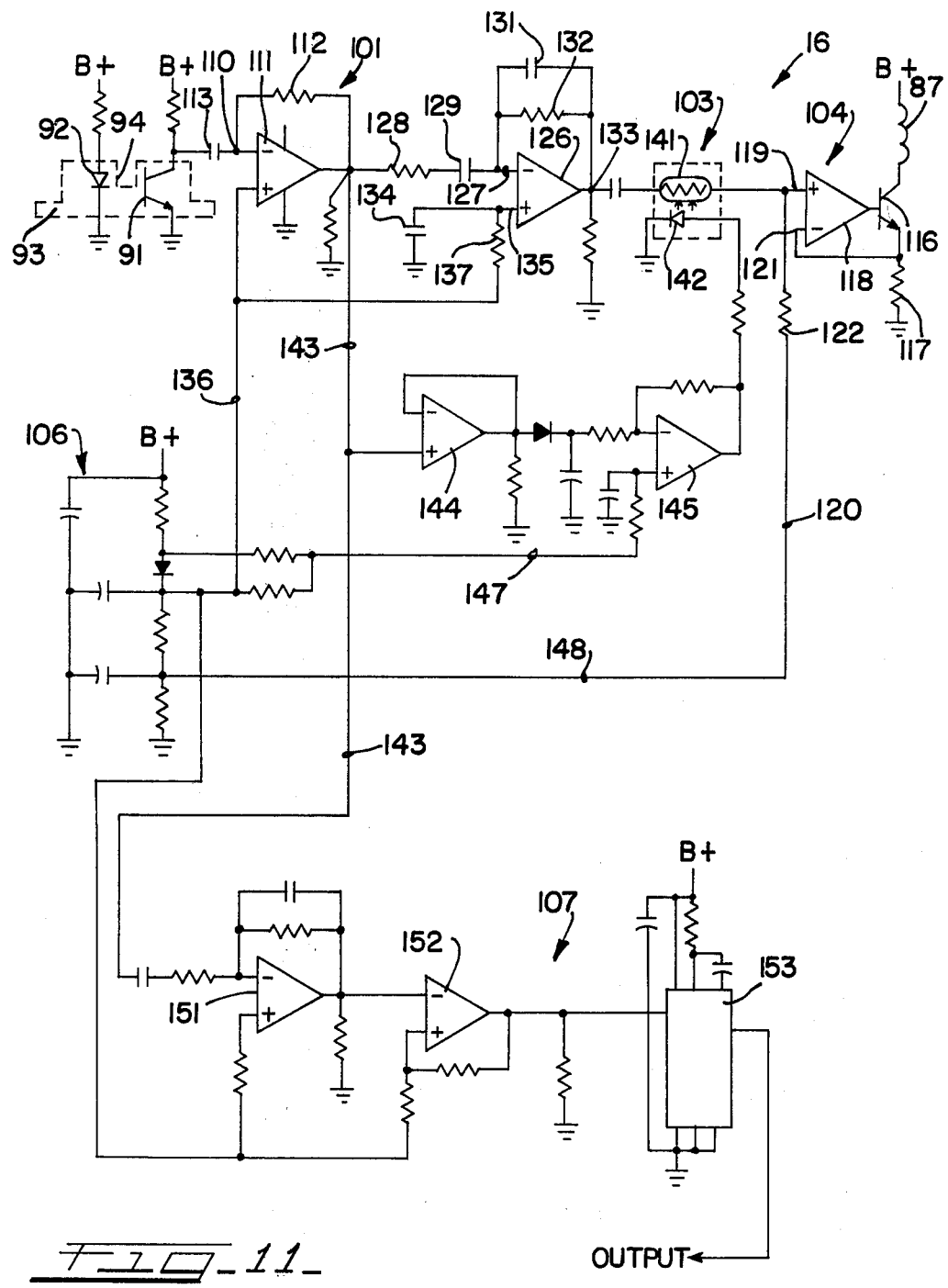
FIG_11

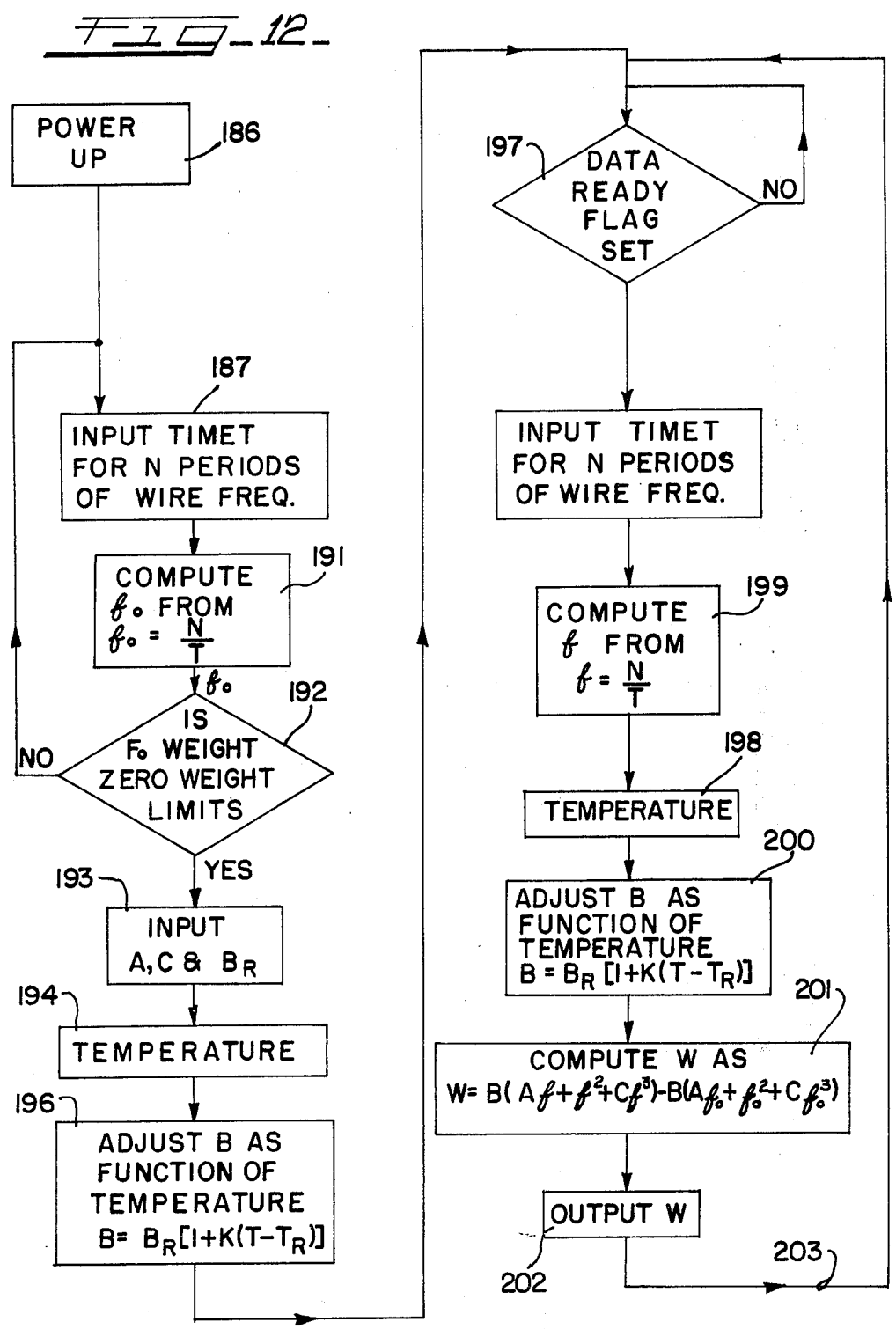
FIG_12

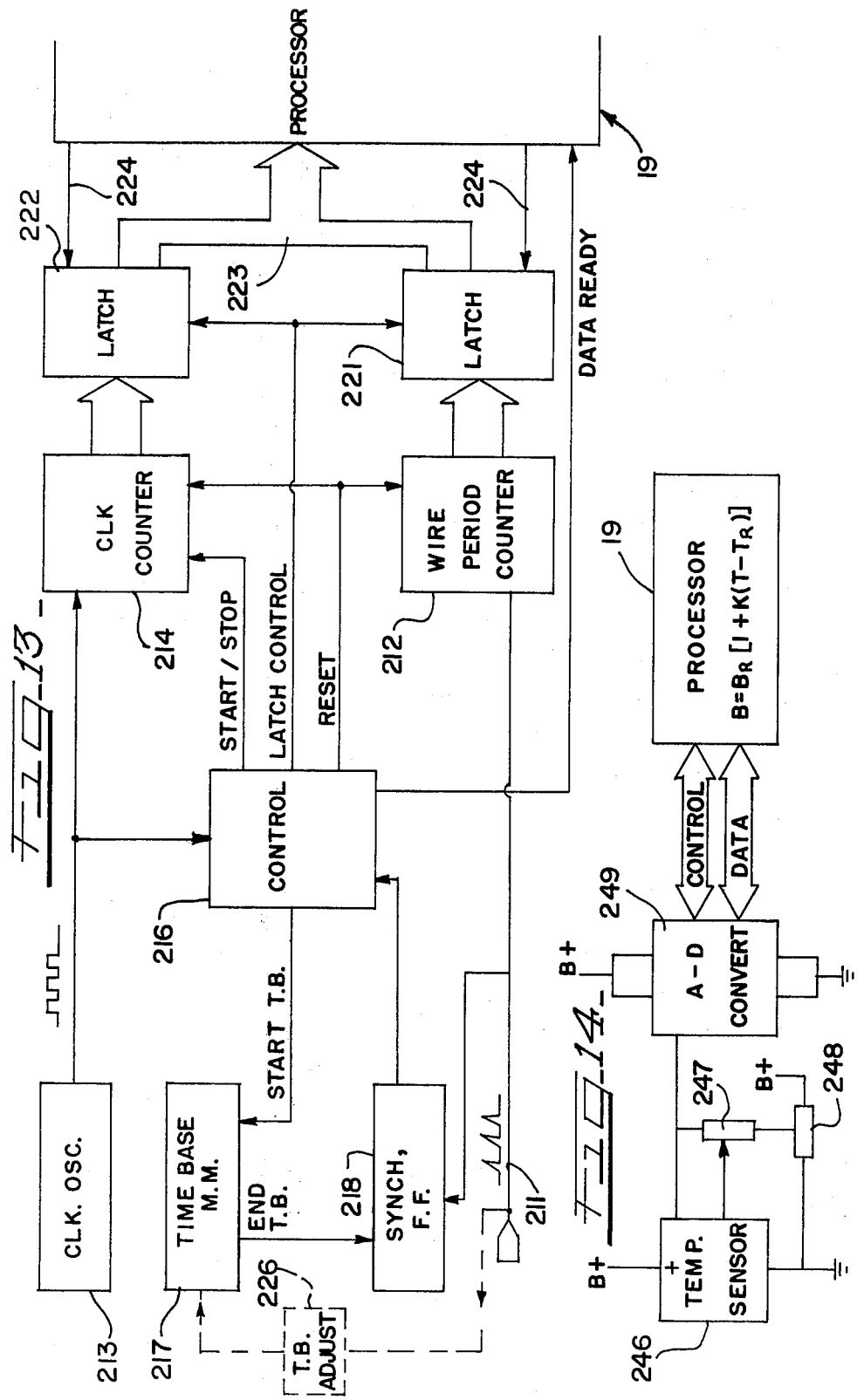

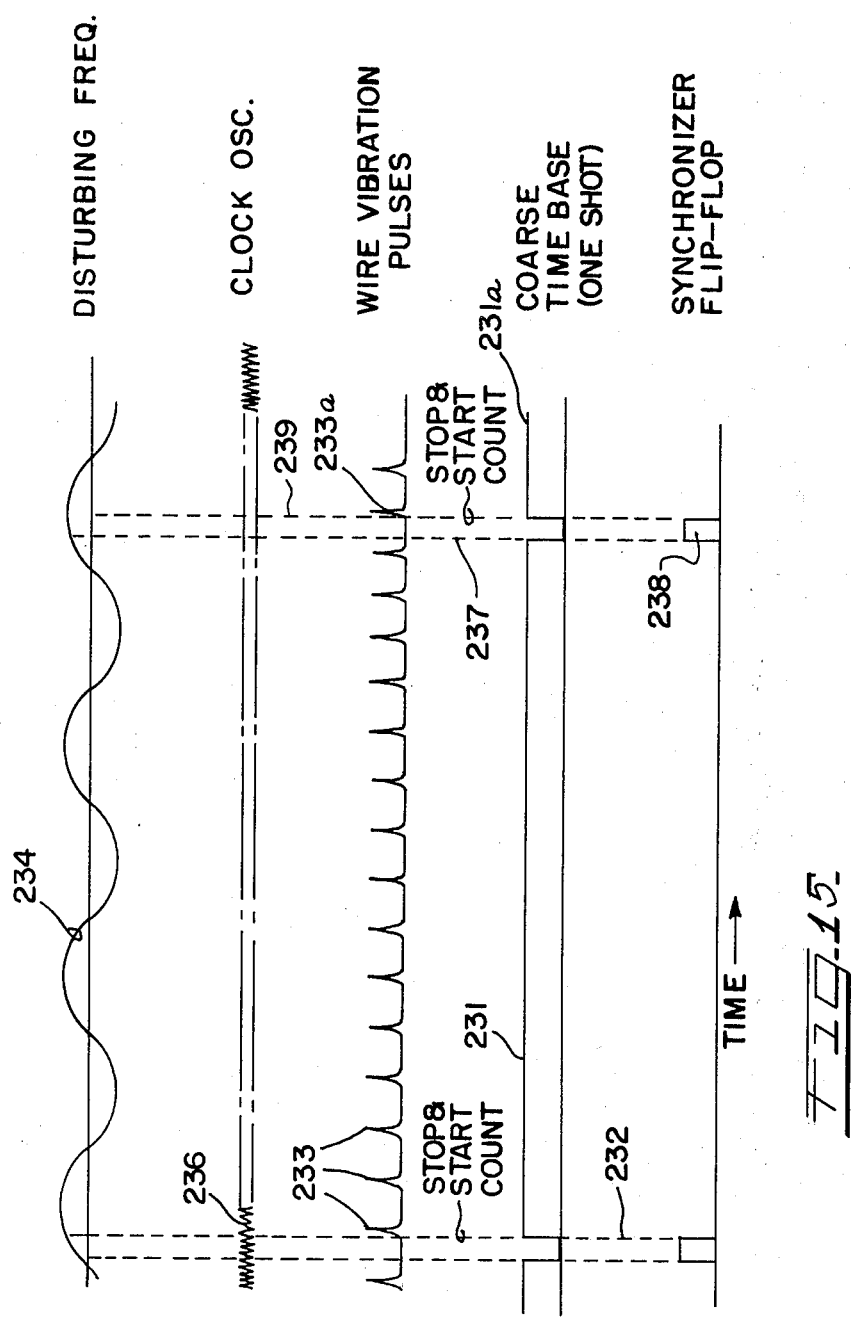

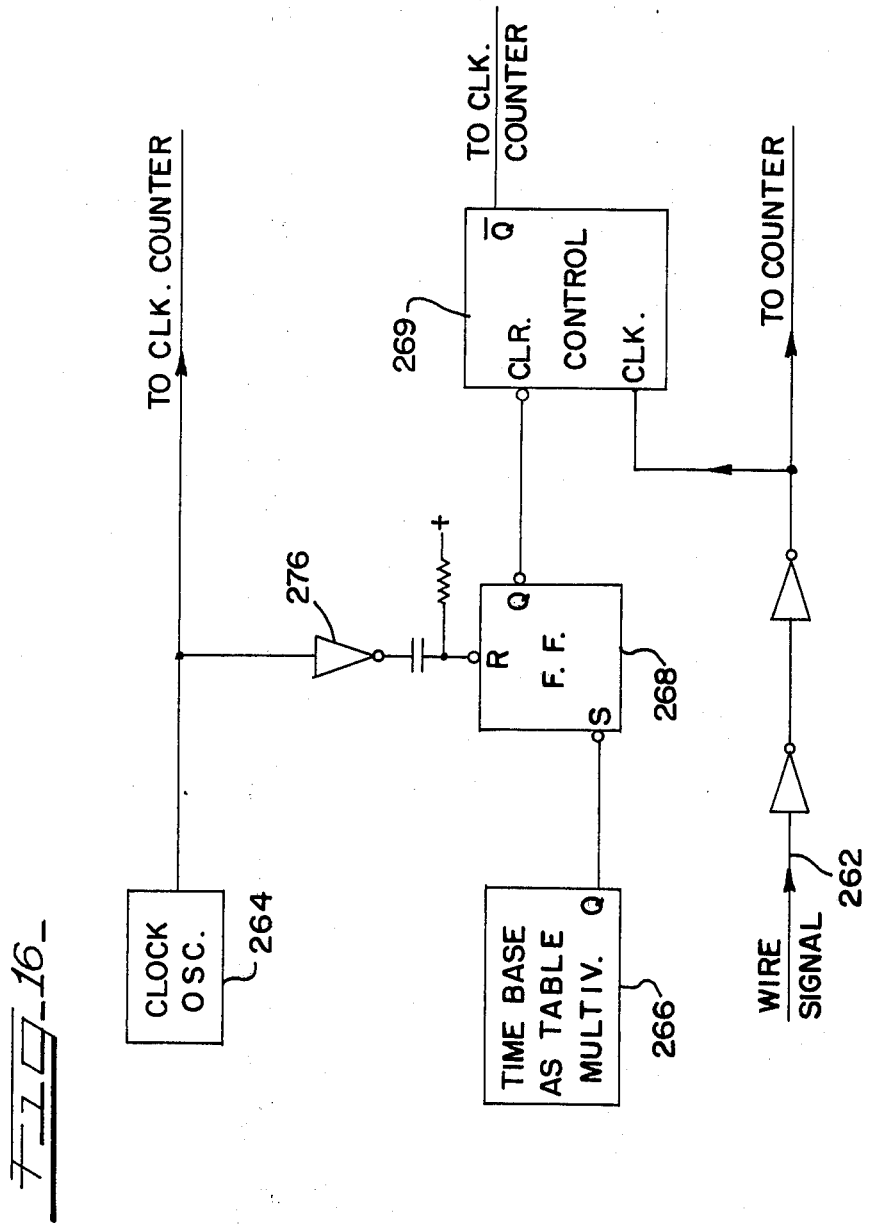

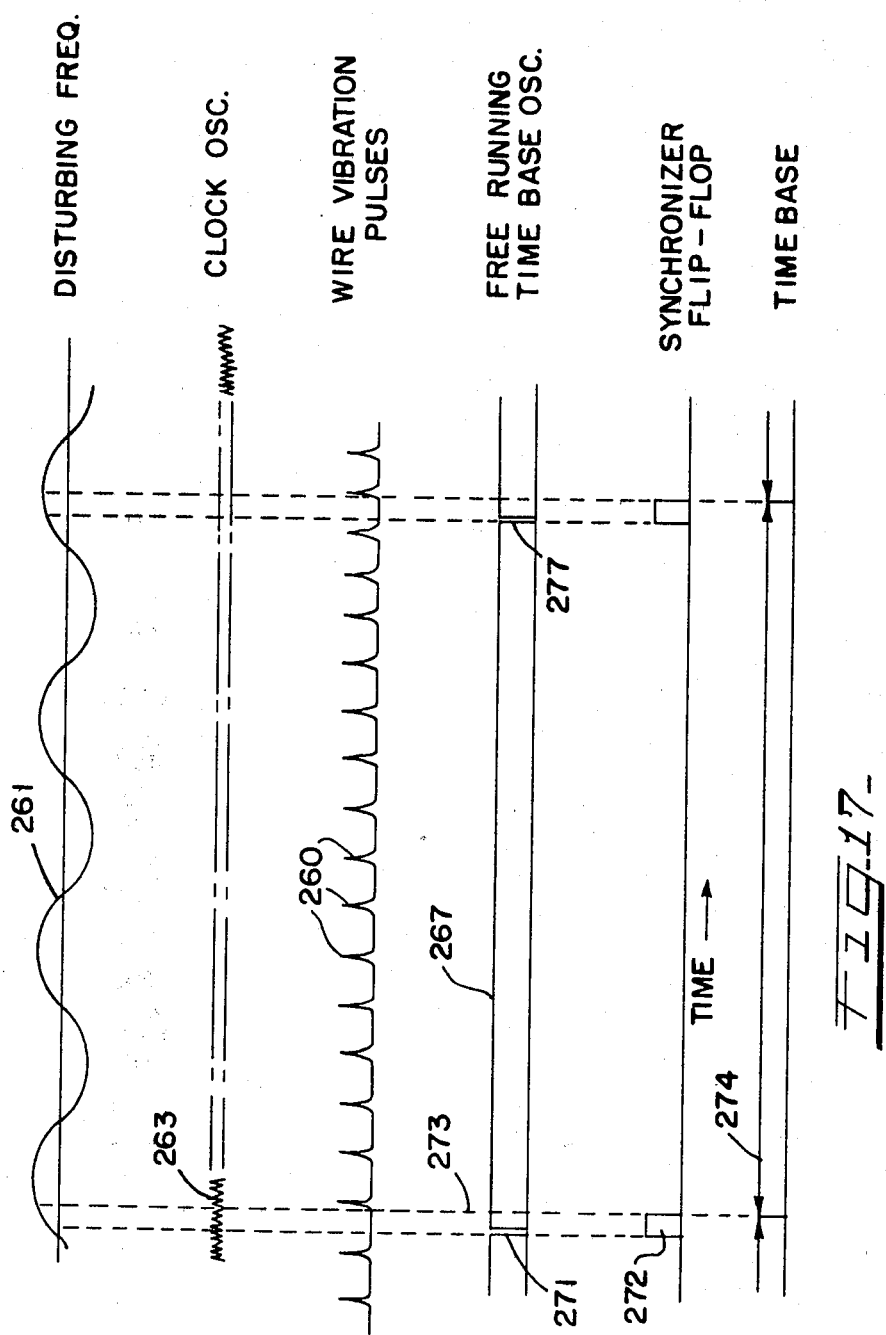

WEIGHT OR FORCE MEASURING APPARATUS

Apparatus constructed in accordance with this invention is used to measure a force such as the weight of an article. An example of apparatus of this character is shown in Streater et al. U.S. Pat. No. 3,712,395, which discloses a scale including a pair of differentially loaded vibrating wires or strings. A weight being measured changes the tensions in the wires which in turn changes the frequencies of vibration of the wires, and the frequencies are functions of the weight. Various other arrangements including one or two vibrating wires have also been used in accelerometers and in scales.

As described in the above U.S. Pat. No. 3,712,395, elaborate precautions have been taken in prior art scales to ensure that the variation in the frequency is an essentially linear function of the weight. This has been considered necessary because prior scales include a calculator that requires a linear weight-frequency function. A linear function is, however, difficult to maintain in production instruments designed for high accuracy. The varying operating conditions encountered by such scales are a further complicating factor, because such scales are sensitive to variations in the ambient temperature and to external vibrations.

It is a general object of the present invention to provide an improved weight or force measuring apparatus that avoids the foregoing problems.

Apparatus in accordance with the present invention comprises a single vibrating wire that is rigidly clamped at its two ends. A base support is connected to and holds one of the two ends of the wire, and a load support is connected to the other end of the wire such that a weight added to the load support changes the tension in the wire. At least two generally parallel flexure members are connected between the load support and the base support and they restrict the movement of the load support to a direction that is substantially parallel to the length of the wire. Vibration dampers and isolators are connected to base and load supports for reducing sympathetic and externally induced vibrations. A wire drive circuit causes the wire to vibrate at essentially its natural resonant frequency. A computer receives the wire vibration frequency and operates in accordance with a cubic equation to produce an accurate weight representative signal. The computer may include means for adjusting constants of the cubic equation to compensate for variations between scales and for variations in operating conditions.

The invention will be better understood from the following detailed description taken in conjunction with the accompanying figures of the drawings, wherein:

FIG. 1 is an electrical block diagram of a scale according to the invention;

FIG. 2 is a perspective view of structural components of the scale;

FIG. 3 is a perspective view of part of the structure shown in FIG. 2 with some parts broken away to show underlying parts;

FIG. 4 is a view similar to FIG. 3 with additional parts broken away;

FIG. 5 is a plan view of the structure shown in FIG. 2;

FIG. 6 is a front elevational view of the structure shown in FIG. 2;

FIG. 7 is a side elevational view with some parts broken away;

FIG. 8 is a sectional view taken on the line 8—8 of FIG. 5;

FIG. 9 is an enlarged sectional view of a part of the structure;

FIG. 10 is an enlarged fragmentary view of another part of the structure;

FIG. 11 is a schematic diagram of a wire drive circuit in accordance with the invention;

FIG. 12 is a flow chart illustrating the operation of the scale;

FIG. 13 is a block diagram of a frequency measuring circuit shown in FIG. 1;

FIG. 14 is a block diagram of a temperature sensing circuit shown in FIG. 1;

FIG. 15 is a timing diagram illustrating the operation of the circuit shown in FIG. 13; and FIGS. 16 and 17 illustrate an alternative arrangement.

While the following detailed description includes references to the locations of parts relative to other parts in a figure of the drawings, such as above or below, and similar references to directions of movement, it will be understood that such references are used only to facilitate the description of the parts, since the apparatus described may have various orientations before and during use. Further, while the description refers to a measurement of weight, this term is intended to encompass both the measurement of the force due to the weight of an article and to the measurement of other forces.

With specific reference first to FIG. 1, a scale in accordance with the present invention comprises a vibrating wire 10 having clamps 11 and 12 secured to its upper and lower ends, respectively. One end of the wire 10 is secured or anchored to a base support 13 and the other end is adapted to have a weight or force applied to it such as to change the tension in the wire. In the present instance the upper end of the wire 10 is anchored and the addition of a weight or force to the lower end increases the tension in the wire. As is well known and as described in U.S. Pat. No. 3,712,395, the natural frequency of vibration of the wire 10 is a function of a number of factors including the tension in the wire, and the frequency of vibration varies as the applied weight is varied.

The scale further includes a pickup or frequency sensor 14 mounted adjacent the wire 10, the output of the pickup being fed to a wire drive circuit 16 better shown in FIG. 11. A driver 17 is also mounted adjacent the wire 10 and receives a signal from the circuit 16 which drives the wire in vibration. The sensor 14 and the driver 17 are preferably located at the midpoint of the wire, as further described hereinafter.

The frequency of vibration is passed to a frequency measurement circuit 18, also shown in FIG. 13, which produces a signal that is a function of the wire frequency. The circuit 18 preferably utilizes the period-average technique wherein the time interval and number of cycles of wire vibration are measured for a nearly fixed period of time. A circuit 20 for adjusting a time base in the circuit 18 is preferably provided to eliminate the effect of disturbing external frequencies or vibrations. The circuits 18 and 20 are also shown in FIG. 13.

The measured time interval and number of cycles of wire vibration are passed to a processor 19 that converts them to an accurately corrected weight signal that is suitable for display and/or for calculations relating to the price of an object being weighed. The corrected signal is passed, in the present example, to a value or price calculation circuit 21 and to a printer and display 22. In the instance where total price is to be calculated, the unit cost of the article, such as dollars per pound, is fed to the calculator 21 by a unit 23. The weight and/or price information may also be fed to a printer 24. The components 21 to 24 may be conventional in construction.

As will be described hereinafter, the processor 19 operates in accordance with a cubic equation or function to be described to convert the measured frequency signal to the corrected weight signal. The cubic function includes a number of constants which may be different from one scale to another. In addition, for a particular scale the constants may change, particularly in response to temperature changes. To produce a highly accurate weight signal, the accurate values of the constants must be inserted in the processor. FIG. 1 shows components 26, 27 and 28 for inserting known weight values, for sensing the ambient temperature, and for computing the constants based on this information. Alternatively, components 29, 30 and 31 may be provided for presetting some of the constants, for sensing the ambient temperature, and for computing the remainder of the constants based on this information.

With reference to FIGS. 2 through 10, the structural parts of the scale include the wire 10 and clamps 11 and 12. As best shown in FIGS. 3 and 10, the wire 10 is preferably a flat band or ribbon that is rectangular in cross-section. The upper clamp 11 comprises two halves or blocks 33 and 34 which are positioned in side-by-side relation with the upper end of the wire between them. A pair of screws 36 secure the blocks 33 and 34 tightly together and securely grip the wire 10. The lower clamp 12 also comprises two blocks which are secured together by two screws 37 and clamp the lower end of the wire, the lower blocks being similar to but shorter than the upper blocks.

The base support 13 has a generally triangular outer configuration when viewed from above, as shown in FIG. 5. Four resilient feet 41 are mounted on the bottom of the base support 13 to permit the scale to be mounted and to absorb vibrations. The base support 13 further comprises vertically extending outer walls 42, 43 and 44, two of the feet 41 being located at the intersections of the wall 43 with the walls 42 and 44. A forward opening is formed between the adjacent ends of the walls 42 and 44, and the vertically extending wire 10 is located in this front opening. The base support 13 further includes vertical interior partitions 46 which form three interior cavities 47 (FIGS. 2, 5 and 8). A bottom wall 48 connects the lower edges of the outer walls and the partitions, and the cavities 47 are filled with a vibration damping material 45 such as sand. To prevent the sand 45 from spilling out of the cavities, the upper surface of the sand is preferably covered by a layer 50 such as epoxy (FIG. 8). The upper clamp 11 rests on the upper surface of the forward ends of the walls 42 and 44 on opposite sides of the forward opening as shown in FIGS. 2 and 5, and a pair of screws 49 secure the clamp 11 to the walls 42 and 44.

As mentioned previously and shown in FIG. 1, a weight or force to be measured is applied to the lower end of the wire. To this end, the scale further includes an upper flat weight or force receiving pan 51 (FIG. 7) that may have a generally rectangular configuration. The pan 51 is supported by a stiff plate 52, and a pad 53 is positioned between the pan 51 and the plate 52. The pad 53 is made of fiberglass and serves to absorb vibrations between the pan and the plate. A shaft 54 (FIGS. 5 and 7) extends downwardly from approximately the center of the plate 52, and it is fastened to a tube 56 (FIGS. 2, 5 and 7) by a tight fit and by a key 57. The tube 56 in turn is connected to a movable support 58 by a resilient connection which in the present instance comprises two vertically spaced rings or bands 59 (FIG. 7). The bands are made of a resilient material such as synthetic rubber, and as will be apparent from FIG. 7, they transfer the force to the member 58 by a shear load. The bands 59 may be vulcanized to the parts 56 and 58 or connected to them by an adhesive.

The movable support 58 is connected to the lower wire clamp 12 and thus transfers the weight to the lower end of the wire 10. The movable support 58 is positioned in a central opening 61 of the base support 13, and it includes two spaced feet 62 which extend forwardly into the opening between the walls 42 and 44 as shown in FIGS. 2-4 and 7. The two feet 62 extend on opposite sides of the wire 10 and rest on the upper surface of the lower clamp 12. The support 58 also includes two upper arms 63 (FIG. 5) which are located generally above the feet 62. The upper surfaces of the arms 63 project above the upper surface of the base support 13.

Means is also provided to guide the movement of the support 58 and to prevent an off-center load on the pan 51 from producing an erroneous measurement, such means including an upper pair and a lower pair of generally parallel flexures 68 to 71 (FIGS. 2, 5 and 7) connected between the base support 13 and the movable support 58. The rearward ends of the upper pair 69 and 71 are positioned on two upward projections 72 (FIGS. 6 and 7) of the base support and are secured to the projections by screws 73, and the rearward ends of the lower pair 68 and 70 are secured to the undersides of two downward extensions 74 by screws 75 (FIG. 2). As shown in FIG. 5, the flexures of each pair are perpendicular to each other. The lower flexures 68 and 70 extend underneath the arms 63 of the movable support 58 and are secured to them by screws 76, and the upper flexures 69 and 71 are secured as by screws 76 (FIG. 5) to the upper surfaces of the arms 63. As shown in FIGS. 2 and 7, slots 77 are formed in the flexures relatively close to the screw fasteners 73, 75 and 76.

Thus, the flexures 68 to 71 are rigidly secured to the support 13 and to the movable support 58, and they are formed by flat spring-like metal. The flexures, of course, form two sets of parallel arms which ensure that any movement of the support 58 is substantially parallel to the length and direction of elongation of the wire 10, and is in a substantially vertical line.

An assembly 81 (FIGS. 5, 6, 7 and 10) that includes the sensor 14 and the driver 17 is fastened to a mounting block or strip 82 that is secured by screws 83 to the forward or outer surfaces of the two walls 42 and 44. The sensor 14 is mounted adjacent approximately the middle of the wire 10, and the driver 17 is just above the sensor 14.

As shown in FIGS. 1 and 7, the wire driver 17 comprises a C-shaped magnetic core 86 and a coil or winding 87 around an arm of the core 86. The thickness of the core is approximately equal to the width of the wire 10 as shown in FIG. 10, and the core 86 is secured to the side of the block 82 which is adjacent the wire 10. A varying current in the coil 87 of course changes the magnetic field in the air gap between the ends of the arms of the core and drives the wire 10 in vibration between the solid and dashed line positions shown in FIG. 10, the wire 10 thus forming part of the magnetic circuit.

The vibration sensor 14 comprises a light sensitive device 91 (FIG. 10) and a light source 92 (also shown in FIG. 11) that are mounted in a holder 93. The holder 93 has a slot 94 formed in it and the parts 91 and 92 are on opposite sides of the slot 94. The holder 93 is fastened to the underside of the block 82 and, as shown in FIG. 10, the center line 96 of the slot 94 makes an angle of approximately 30° with the direction 97 of vibration of the wire 10. The holder 93 is mounted at a position where the wire 10, when vibrating, alternately covers more or less of the light path between the two parts 91 and 92 and thereby varies the amount of current in the device 91. By mounting the holder 93 at an angle as shown, relative to direction 97 of vibration, the wire 10 casts a wider shadow than would be the case if the lines 96 and 97 were parallel, thereby enabling the use of a standard sensor 14 that is available, for example, from Texas Instruments Company.

The wire drive circuit 16 is shown in detail in FIG. 11, and it forms one part of an oscillator loop that also includes the sensor 14, the driver 17, and the wire 10. The total phase shift in the oscillator loop is zero, and it is an important feature of this invention that the phase shift is closely controlled. If there were a phase shift in the loop, the wire would be forced to vibrate at other than its natural resonant frequency, which would cause error in measurements as will be discussed hereinafter.

With reference to FIG. 11, the wire drive 16 includes the sensor 14, a current-to-voltage amplifier 101, a phase shifting circuit 102, an automatic gain control (AGC) 103, and a voltage-to-current driver amplifier 104. A voltage supply circuit 106 provides the necessary system DC voltages, and a signal output circuit 107 conditions the vibration frequency signal.

The pick-up 14 comprises, as a specific example, an infra-red light source 92 and a phototransistor 91 which are mounted in the holder 93. The wire 10 vibrates in the space 94 between the parts 91 and 92 and alternately blocks off more or less of the light beam, as previously mentioned. To avoid unwanted phase shift in the pick-up 14, the photo transistor 91 is treated as a current source connected to the amplifier 101 which has nearly zero input impedance. The amplifier 101 includes an operational amplifier (Op Amp) 111 having its inverting input connected to a summing junction 110 that is connected to the transistor 91 through a blocking capacitor 113 and to a feedback resistor 112. The noninverting input is connected to a reference DC voltage or line 136.

Since the output voltage of the Op Amp 111 is fed back to the junction 110, this junction is maintained at a very low voltage regardless of the input current from the phototransistor 91. Consequently, the apparent input impedance of the amplifier 111 is very low and is limited only by the open loop gain of the amplifier and feedback resistance 112, and this low impedance load results in minimum phase shift in the phototransistor 91 circuit.

As a specific example of component values selected to minimize phase shift in the pick-up circuit, the pick-up 14 comprises a Texas Instruments Company Model TIL 143 and the Op Amp is one-fourth of a Motorola quad amplifier Model LM 324. A coupling capacitor 113 has a value of approximately 10 microfarads and the feedback resistor 112 has a value of 6.2 Kohms. At these values, the pick-up 14 and the amplifier 101 produce essentially zero phase shift. The feedback resistor 112 is chosen to provide a 1 volt peak output from the Op Amp 111 for a wire vibration of 0.001 inch maximum.

With regard next to the driver 104, the C-shaped core 86 (FIGS. 1 and 7) and the wire 10 form a nearly closed magnetic circuit, thereby reducing leakage magnetic flux and the resulting phase shift. The drive coil 87 is preferably fed by a current source so that the varying impedance of the coil with frequency does not result in a phase shift, as would be the case if the coil were driven from a voltage source. The use of the C-shaped core and the wire as the magnetic circuit produces a number of advantages, primarily that it is not necessary to have the pole faces extremely close to the wire in order to produce an effective wire drive. In the present specific example, the pole faces are spaced approximately 0.020" from the wire. When the magnetic material is placed in very close proximity to the wire, an air cushion or layer may be set up between the pole faces and the wire which affects the vibrating characteristics of the wire and may introduce phase shift. Further, the relatively wide spacing between the pole faces and the wire permits a greater spacing tolerance for easier assembly of the parts during production. Still further, the C-shaped design of the core and the use of the vibrating wire as part of the magnetic circuit produces a minimum phase shift between the current in the drive coil 17 and the flux in the air gap between the core and the wire.

The coil 87 is connected in series with a transistor 116 and a resistor 117, the coil 87 being connected between B+ and the collector of the transistor. The base of the transistor 116 is connected to the output of an Op Amp 118 which has its noninverting input 119 connected to receive the frequency signal. The inverting input 121 of the Op Amp 118 is connected to the emitter of the transistor 116.

The transistor 116 and the Op Amp 118 provide drive current for the coil 87 as previously mentioned. The coil 87, of course, produces a varying magnetic flux which corresponds to the voltage at the input 119, and a force which is proportional to the square of the magnetic flux in the air gap acting to deflect the wire. The flux, in turn, is proportional to the amount of current flowing through the coil 87 when operating at below its saturation level, and therefore with a current drive as described, the variation in the impedance of the electromagnet with frequency does not influence the drive amplitude and cause a shift in the phase. In addition, a bias current is provided in the coil 87 by virtue of a bias voltage appearing on the input 119 of the Op Amp 118. The input 119 is connected through a resistor 122 to a 0.2 volt line 120 from the voltage supply 106, and a steady DC voltage, in the present example the value being 0.2 volt, appears at the input 119 and produces 0.2 volts across the resistor 117 and a bias current of approximately 40 milliamps through the coil 87 and the transistor 116. If a bias DC current were not provided, the magnetic force acting on the wire 10 as a result of a pure sinusoidal current in the drive coil would contain no fundamental frequency component but would provide a second harmonic component of force. However, by providing a bias current in the coil 87, a fundamental frequency force is generated. The second harmonic is further subdued by virtue of the fact that the pick-up 14 is located at essentially the center point of the vibrating wire 10 which is a nodal point for the second harmonic.

As previously mentioned, the transistor 116 and the Op Amp 118 form a current drive for the coil 87 and this is advantageous as compared with a constant voltage drive. If a voltage drive were used instead of a current drive, the phase angle of the coil impedance would change with wire vibration frequency, and with a voltage drive the drive coil current would decrease with increasing frequency, thereby resulting in a smaller vibration amplitude. In the present arrangement, the wire vibration amplitude is controlled by varying the amount of current flowing through the coil 87. There is, however, a 90° phase shift or relationship that exists between the flux in the magnetic air gap, which follows the current in the coil 87, and the displacement of the wire 10 when it is vibrating at its natural resonant frequency.

The function of the differentiator 102 is to provide a 90° leading phase shift and an inversion which will offset or compensate for the above-mentioned phase shift in the driver 104. While an integrator could be used to provide the compensating phase shift, the use of a differentiator has the advantage in the present system that it provides increasing gain with an increase in the wire drive frequency, which is not the case with an integrator. While an integrator might be considered for use in place of a differentiator because the differentiator emphasizes any high frequency noise components at the output of the amplifier 111, when used with a vibrating wire having a large Q, as in the present construction, the wire acts as a very sharp band pass filter and the wire vibrates in a sinusoidal manner that is unaffected by the presence of noise in the drive coil 17. Still another advantage of using a differentiator rather than an integrator is that a differentiator circuit produces a decreased loop gain at frequencies which are below the normal wire vibration frequency range. In the present example, the normal vibration frequency range is around 1,000 Hertz to 3,500 Hertz. It has been found that some of the structural components illustrated in FIGS. 1 through 10 have a natural resonant frequency at below the range of normal wire vibration frequencies, around 30 Hertz. While an integrator circuit would probably cause oscillation at this mode and thereby disrupt the normal vibration frequency of the wire, the differentiator circuit, as described, provides insufficient loop gain at this relatively low frequency.

The differentiator circuit 102 includes another Op Amp 126 having an inverting input 127 connected to receive the frequency output signal from the pick-up amplifier 111. A resistor 128 and a coupling capacitor 129 are connected between the amplifiers 111 and 126. A feedback loop including a feedback capacitor 131 and a resistor 132 is connected between the output 133 of the amplifier 126 and the inverting input 127. The other input 135 of the amplifier 126 is connected through a capacitor 134 to ground, and also to the bias voltage line 136 that is connected to the voltage supply 106. A resistor 137 is connected between the line 136 and the positive input 135 of the amplifier 126.

The differentiator circuit includes a number of advantages, as mentioned previously, including the fact that it produces increasing gain and drive with increasing frequency, and this is desirable to obtain a constant wire vibration amplitude with varying frequency, this feature being necessary for a good signal to noise ratio. In the event the differentiator circuit 102 does not produce an exactly 90° phase shift, an adjustable phase shift circuit may be included in the differentiator or in one of the other driver circuits, for adjusting the phase to achieve an overall zero phase shift.

As mentioned above, it is highly advantageous to have the wire vibration amplitude maintained constant for good signal to noise ratio characteristics, and in the present specific example the desired peak amplitude of vibration is approximately 0.001 inch. The wire vibration amplitude is stabilized or held substantially constant over the range of the frequency of vibration of the wire by controlling the magnitude of the gain in the wire drive loop, utilizing the automatic gain control (AGC) 103. In the present specific example, the output signal of the pickup amplifier 111 is maintained at approximately 1 volt peak, and the feedback resistor 112 is chosen to provide ths peak output voltage.

The AGC circuit 103 includes a photoresistor device 141 that is connected between the output 133 of the amplifier 126 and the input 119 of the amplifier 118. Mounted adjacent the photoresistor device 141 is a light emitting diode (LED) 142 that responds to the voltage at the output of the pick-up amplifier 111. A conductor 143 is connected to the output of the amplifier 111 and to the input of a unity gain buffer amplifier 144, and an amplifier 146 amplifies the signal fed to the diode 142. If, for example, the voltage at the output of the amplifier 111 increases, the current through the diode 142 decreases and causes the resistance of the photoresistor 141 to increase, thereby reducing the strength of the signal passed to the input 119 of the amplifier 118. Since the photoresistor 141 operates as a variable resistor at the present operating frequencies, little or no phase shift is produced.

As previously mentioned, the power supply circuit 106, which may be conventional, provides DC voltages for operation of the system. In the present specific example, B+ is plus 5 volts DC, the voltage on the line 136 is plus 1.779 volts DC, the voltage on a line 147 is plus 2.054 volts DC and the voltage on a line 148 is plus 0.20 volt DC.

The vibration frequency output signal from the circuit of FIG. 11 appears on the line 143 which is connected to the output of the amplifier 111. An Op Amp 151 is connected to form a band pass amplifier, another Op Amp 152 is connected to form a trigger and interface circuit, and a TTL logic one-shot component 153 produces a train of sharp pulses at the frequency of vibration of the wire, each pulse having a duration of, for example, 70 microseconds. The circuit 152 may be a Schmitt trigger that produces a square wave and the component 153 may be a TTL logic device that produces pulses having very sharp edges. The signal conditioning circuits 151, 152 and 153 may produce some phase shift but a phase shift in these components would not affect the accuracy of the system.

The scale further includes a damper 161 (FIGS. 4, 7 and 9) for damping movement of the movable support 58 and for absorbing vibrations. The damper 161 comprises a cup 162 that is fastened to the bottom wall 48 of the base support 13, and a piston 163 that is fastened to the movable support 58. The bottom wall 48 of the base support 13 has a hole 164 formed through it, in the area that is between the legs 62 of the movable support 58. A screw or stud 166 is fastened to and extends downwardly from the bottom of the cup 162, and it extends through the hole 164. A resilient washer 167 and a nut 168 fasten the screw to the support 13. On the upper side of the support 13, a washer 169 is positioned, the washer 169 and the bottom of the cup 162 having mating spherical surfaces. Thus, the cup 162 can be tilted slightly on the spherical surfaces to obtain proper alignment of the cup with the piston.

The piston is secured to the lower end of a rod 171 which, in turn, is secured to the movable support 58. The rod 171 extends vertically through a passage 172 (FIG. 7) formed in the support 58 between the arms 63, and it is secured in place by a set screw 173. A flexible sleeve 174 (FIG. 9) extends between the rod 171 and the cup 162 and seals the cup, the sleeve being held at its ends by bands 176.

As is best shown in FIG. 9, the inner side 177 of the cup 162, and the outer surface of the piston 163 have mating tapered surfaces. The tapered surfaces are relatively close together, the spacing being exaggerated in FIG. 9. A viscous damping fluid 178 fills the cup 162, the fluid 178 being inserted through a fill hole in the stud 166, the fill hole being capped by a fill screw 179.

The damper 161 has a number of advantages. The piston 163 and the cup 162 may be self-aligned by loosening the nut 168, moving the piston down to engage the tapered surfaces, and then tightening the nut. The amount of the damping force may be easily adjusted by adjusting the height of the piston, using the set screw 173. Further, the amount of the damping force is automatically increased with added weight, due to the tapered surfaces. It should be kept in mind, however, that the amount of vertical movement of the piston is very small, and is due to the stretching of the wire 10 and the flexing of the flexures 68-71. The fluid 178 may be a light silicone oil. Damping is effected by the viscous friction of the oil, by "squeeze" film damping, and by the force exerted between parallel surfaces with the fluid and with movement parallel to the surfaces.

With reference again to FIG. 1, the frequency measurement circuit 18 receives the train of sharp pulses from the drive 16 shown in FIG. 11, the pulses having the frequency of vibration of the wire 10. The circuit 18, which will be described later in connection with FIG. 13, produces digital outputs which are fed to the processor 19. The processor 19 may be hard-wired or it may be a microprocessor programed to convert the digital signals to a corrected weight representative digital signal, according to the cubic function:

$$W = B(Af + f^2 + Cf^3) - B(Af_o + f_o^2 + Cf_o^3) \quad (1)$$

where

A, B and C are constants;

f is the wire vibration frequency signal with a weight on the pan 51, and $f_o$ is the initial frequency of vibration of the wire 10 with zero weight on the pan.

The wire vibrates between, for example, 1000 Hz to 3500 Hz for a range of zero weight up to a maximum or rated weight of about 30 pounds. The initial tension in the wire 10 at zero weight, which produces the initial frequency $f_o$, is produced by the weight of the scale parts and by the flexures 68 to 71 which are adjusted to produce an initial wire tension.

The three constants A, B and C may be measured for a particular scale, and representative values are $A = -142.73417$; $B = 2.5422383 \times 10^{-6}$; and $C = 1.0557031 \times 10^{-7}$. These three constants may be determined, for example, by placing a number of known weights on the scale and noting the wire vibration frequency for each known weight. With a number of data points thus established, the three constants may be determined using, for example, the method of least squares fit. Values of A, B and C may then be set in the processor which may include manually adjustable circuits for adjusting the values for an individual scale for this purpose. Alternatively, the components 26-28 may be provided to receive known weight and frequency signals and calculate the constants for the processor 19. The components 26-28 may be built into the processor 19 or they may be in a separate unit that is plugged into the processor when it is desired to recalibrate the scale. The temperature sensing component 27 may be provided to adjust one or more of the constants in accordance with ambient temperature.

FIG. 12 shows a flow chart for the operation of the scale including setting the constants A, B and C utilizing the components 29-31 (FIG. 1). The power to the scale is turned on at block 186. At block 187 the length of time T for the measurement circuit 18 to count a number N of wire vibration cycles on the line 211, is input. The block 187 will be discussed further in connection with FIG. 13. With zero weight on the pan, $f_o$ is calculated in block 191 from N and T. In decision box 193, the frequency $f_o$ is compared with preset zero weight frequency limits. If it is within the limits for proper operation of the scale, the system proceeds to block 193 where A, C and $B_R$ are inserted. These values may be calculated beforehand using known weights and the method of least squares fit and preset in the processor, as previously mentioned in connection with components 29, 30 and 31. The constant $B_R$ is the value of B at a known ambient temperature, and the value of B is adjusted, as will be described in connection with FIG. 14, to accommodate temperature variations. In the flow chart, the ambient temperature is sensed in block 194 and B is adjusted in block 196.

An article to be measured is placed on the scale pan and when a data ready flag is set, a decision box 197 determines that this is the case. If yes, the frequency measurement circuit 18 has measured T and N and the processor 19 calculates f in box 199. Boxes 198 and 200, an adjustment for temperature is made similar to the boxes 194 and 196. In block 201 the processor 19 produces a weight signal W using equation (1). At block 202 the weight signal is passed to the components 21, 22 and 24, and the system branches back on line 203 to box 197 in readiness for the next weighing operation.

FIGS. 13 and 15 show in greater detail the construction and operation of the circuits 18 and 20. The vibration frequency signal, consisting of a series of relatively sharp pulses 233, is received on a line 211 from the drive 16, and it is fed to a period counter 212. A clock oscillator 213, which in the present example is 4 Mhz, has its output connected to a clock counter 214 and to a control 216. This control 216 may be dual presettable 4 bit counters. A time base (TB) monostable multivibrator (one-shot) 217 and a synchronizer flip flop 218 are connected to each other, to the control 216, and to the line 211. The control 216 is also connected to the counters 212 and 214; to latches 221 and 222 at the outputs of the counters 212 and 214; and to the processor 19. The latches 221 and 222 are also connected by a data bus 223 and lines 224 to the processor 19.

The operation of the circuit of FIG. 13 is described in conjunction with FIG. 15. A course time base 231 is started by the multivibrator 217 at time 232, which is in synchronism with the leading edge of a wire frequency pulse 233. During the time base 231, the wire pulses 233 are counted by the counter 212 (which may be an 8-bit counter), and the oscillator 213 cycles 236 are counted by the counter 214 (which may be a 32-bit counter). The multivibrator 217 is adjusted so that the length of the time base 231 is nearly equal to an integral number of cycles of a disturbing frequency 234 that modulates on the wire vibration frequency appearing on the line 211. If the disturbing frequency is known, the multivibrator 217 may be manually adjusted.

A disturbing frequency signal usually originates from an electric motor driven device near the scale, and such disturbances are related to 60 Hz (in the United States) vibrations. Such a disturbance affects the scale similar to a vibration or movement of the scale pan, and it is as though an article being measured were cyclically increasing and decreasing in weight at the rate of the disturbing frequency. Thus, the wire vibration frequency would also vary at the same rate. However, the effect of the disturbing frequency is cancelled in the present system because the average of the disturbance over a full cycle is equal to zero. Since the time base 231 is nearly equal to an integral number of periods of the disturbing frequency, its effect is averaged out and nullified.

It should be kept in mind that the chart of FIG. 15 does not show the actual relationships between the various frequencies, and that its intended use is to illustrate the operation of the system. The signal 234 may be near to or at 30 to 60 Hz, for example, the clock oscillator signal 236 may be at 4 MHz, the pulses 233 may be at 1,000 to 3,500 Hz, and the time base 231 may be 67 ms.

When the multivibrator 217 times out at time 237, it enables the flip-flop, as shown by the square pulse 238. The rising edge of the next succeeding wire pulse 233a, at time 239, causes the flip-flop 218 to change state, and this action causes the control 216 to trigger the multivibrator 217 and initiate the next time base 231a. The control 216 also effects the following series of actions: it stops the counter 214 from counting clock pulses; it allows time (4 us) for ripple-through of the counter 214; it actuates the latches 221 and 222 to latch both of the counts; it clears both counters 212 and 214; it restarts the counter 214 to count pulses during the time base 231a; and it signals the processor 19 that valid data is ready.

The counter 212 does not miss any of the wire frequency pulses, but the clock counter 214 omits, in the present specific example, 32 cycles of the oscillator 213. These cycles are omitted during the beginning of each new time base to make allowance for the required 4 us ripple time of the counter 214 and this 4 us is provided by the control 216. The 32 cycles are, however, accounted for by the processor 19. When the processor 19 receives a ready signal, it receives the counts of the two counter latches 221 and 222. The frequency is then calculated from the equation:

$$f = \frac{N \times \text{CLOCK FREQ.}}{T + 32} \quad (2)$$

where
N is the wire period count of the counter 212
T is the clock oscillator count of the counter 214 and CLOCK FREQ. is the frequency of the oscillator 213.

The number 32 in the denominator of equation (2) replaces the previously-mentioned omitted counts.

The foregoing description and FIG. 15 illustrate how a coarse frequency measurement is made, and the coarse frequency may be utilized to determine whether the scale pan has settled, for example. To obtain a fine or more accurate frequency measurement, a series of consecutive coarse measurements may be combined. Since none of the wire pulses or the clock cycles are missed when going from one time base to the next, a highly accurate frequency measurement may be made by combining, for example, four coarse measurements. It should be noted that the count always begins and ends at the beginning of a wire pulse, so that full wire periods are measured. The actual counting time is slightly different from an integral number of periods of the disturbing frequency 234, this error being the difference between the times 237 and 239.

To attain maximum accuracy, provision may also be made for accommodating changes in the ambient temperature, these changes affecting the characteristics of the metal parts shown in FIGS. 2 to 9. It has been found that an accurate frequency correction may be made by modifying the constant B in equation (1). This adjustment may be made manually if it is known beforehand at what temperature the scale will operate. Alternatively, FIGS. 1 and 14 show an automatic frequency correction.

In FIG. 1, the constants A, C and $B_R$ are preset, and the circuit of FIG. 14 presumes that $B_R$ is valid for an ambient temperature of 50° C. The component 246, which in the present specific example may be a National LM 3911 that includes a temperature sensor and an operational amplifier, produces a DC voltage that is proportional to its temperature. A gain adjustment 247 and a bias adjustment 248 are adjusted to produce a 1.95 voltage variation for a 0° to 50° C. temperature change, the voltage at 50° C. being 0.5 volts. The voltage is fed to an A to D converter 249 which produces a 8-bit digital signal. The converter 249 may be a National ADC 0809 that produces one binary digit change for each ½ C. temperature change. The processor 19 receives the digital signal from the converter 249, subtracts a fixed offset (which is the value corresponding to the value at 50° 1 C.), and multiplies the result by a constant which reflects the temperature dependency or characteristic of a particular scale and may be determined empirically. The resulting quantity is added to the initially preset value $B_R$ to produce the value B. The foregoing values are, of course, given as examples to better illustrate the operation of the circuit, and other values could instead by used.

Accurate temperature compensation may also be achieved without the need for adjusting the constants A, B and C, by a proper choice of materials for parts of the scale. A weight or force on the pan 51 is supported by the wire 10 and to some extent by the flexures 68 to 71. As ambient the temperature increases, the length of the metal wire 10 increases due to thermal expansion and to a change in the elastic modulus. The elastic modulus of the metal flexures also changes, causing it to support less of the load as the temperature increases. When the flexures 68 to 71 are made of aluminum and the wire 10 is made of steel, the changes with temperature will almost exactly balance or compensate each other, resulting in an automatic or inherent temperature correction. Steel alloys and aluminum alloys may be used; as a specific example, the wire 10 was made from a slice of feeler gauge material, and the flexures were made of 6061 aluminum alloy. The temperature coefficients of the elastic modulus for steel and aluminum alloys are relatively independent of the type of alloy if the added materials are less than 5%. If the flexures are made of aluminum, it is preferred that the supports 13 and 58 also be made of aluminum so that they will have similar coefficients of thermal expansion.

FIGS. 16 and 17 illustrate a circuit that is similar to 13 but provides increased accuracy. The wire signal 260 (FIG. 17) and a modulating disturbing frequency 261 appear on a line 262, and a clock signal 263 is produced by an oscillator 264. A free-running astable multivibrator 266 produces a signal 267. A flop-flop 268 receives the signals 267 and 263, and a control flop-flop 269 receives an output of the flip-flop 268 and the signals on the line 262.

Assuming that the Q output of the multivibrator 266 has just become low, as indicated at 271 in FIG. 17, for an arbitrarily short time prior to retriggering, this transition to low sets the flip-flop 268 as indicated at 272. This action in turn causes the Q output of the flip-flop 268 to supply an enable signal to the control slip-flop 269. At the leading edge of the next wire signal pulse, indicated at 273, the Q-output of the control 269 will become low and enable the clock counter 214 to start counting clock cycles 263. This is the start of the time base indicated at 274. The clock signal is fed to the reset input of the flip-flop 268 through an inverter 276, and the occurrence of the positive transition of the next clock cycle 263, the flip-flop 268 is reset, causing the control flip-flop 269 to be disabled for subsequent wire signal pulses 260 until the multivibrator 266 again enables the flip-flop 269. At the end 277 of the period of the vibrator 266, the foregoing series repeats itself. It will be apparent from FIG. 17 that the counter 214 counts the clock cycles for successive time bases 274 and that the time bases closely adjoin each other. When a series of coarse time bases are combined to produce a fine time base as previously mentioned, the arrangement shown in FIG. 16 prevents any accumulation of error in the compensation for the disturbing frequency 261.

The processor 19, shown in FIG. 1, utilizes a third order polynomial equation to produce an accurate weight signal. A second order polynomial (deletion of $Cf^3$ and $CF_0^3$) could be used but with reduced accuracy. On the other hand, a fourth order or higher polynomial could be used for increased accuracy, but would require increased program complexity.

For a given maximum stress (tension/area) on the wire 10, the function (1) is valid for wide variations in wire geometries and total capacities, provided that the value of the expression $L4/t^2$ is greater than $10^5$ and $in^2$ where L is the wire length in inches, and t is the wire thickness in inches. As an example, starting with t=0.005 inch, the function was valid for a 30 pound capacity wire and produced errors of less than 0.03 pounds up to a wire thickness of 0.0235 inch. At this wire thickness the wire width was about 0.009 inch for the same stress level. The pretension, or wire tension at zero weight, was approximately 3 pounds. Further, the function is valid for values of L such that the thickness of the wire 10 was less than 0.001 inch for the same stress level.

Thus, a scale in accordance with the present invention achieves highly accurate results without mechanical complexity. The function (1) produces an accurate weight signal for a scale including a single vibrating wire that is rigidly fastened at both ends, where the force of the weight is directed along the length of the wire, where the wire tension is changed from an initial tension with a change in the force, where the wire vibrates at essentially its natural or resonant frequency, where vibration isolators and dampers are provided to avoid external and internal vibrations, and where the vibration amplitude of the wire produced by the wire drive is essentially constant.

The clamps 11 and 12 and the supports 13 and 58 form rigid supports for the two ends of the wire 10. The flexures 68 to 71 cause the support 58 and the lower clamp 12 to move essentially parallel to the length of the wire 10. The weight of the scale parts and the flexures produce an initial or preset tension in the wire. While the scale shown in the drawings operates to increase the wire tension with an increase in weight, an arrangement is also possible where the wire tension is decreased with an increased weight.

The wire vibrates at essentially its natural frequency because there is substantially no phase shift in the wire 10 and drive circuit 16 loop and thus there is substantial independence of the wire vibration as a function of the Q of the wire. The drive circuit 16 also applies an essentially constant drive amplitude of the wire.

The vibration dampers and isolators include the resilient feet 41, the members 59, the pad 53, the tapered cup 161, and the sand 48 in the support 13. The pad 53, which is a low density, partially compacted fiber glass, and the members 59, which transfer the load by shear stresses, effectively reduce vibrations caused by an object on the pan 51. The tapered cup damper also prevents sustained movement of the pan when an object is placed on it. The sand in the cavities of the support absorb harmonic sympathetic vibrations of the structural parts.

The circuit 18 provides an accurate measurement of the vibration frequency, and it may include means for cancelling the effect of external disturbing frequencies. The processor 19 preferably includes means for adjusting at least one of the constants of the function (1). Such an adjustment is desirable because structural differences between scales may require different values of the constants. Thus, a high degree of precision in making and assembling the parts is not required, because differences between scales may be corrected by an adjustment of one or more of the constants. Temperature variations may also be accommodated by adjustment of the constants or by the choice of materials for the structural parts so that they automatically compensate for temperature changes.

When the temperature is compensated for as shown by the component 31 in FIG. 1 and the circuit shown in FIG. 14, the value $B_R$ is the value of B determined at the elevated temperature $T_R$ (50° C. in the example). The constant K may be determined from:

$$K = - \frac{\Delta W}{W(T - T_R)} \quad (3)$$

where T is an elevated temperature and there is a weight error of $\Delta W$ in the indicated value from the correct weight W. A known weight W is, of course, used.

What is claimed is:

1. Apparatus for measuring a force, comprising a wire, support means rigidly supporting both ends of said wire, force receiving means connected to said wire and tensioning said wire along its length, the amount of said tension being a function of said force, vibration sensor-driver means mounted adjacent said wire for sensing the frequency of vibration of said wire and for driving said wire in vibration at substantially its natural frequency, and means connected to said support and said weight receiving means for damping and absorbing vibrations, said force receiving means comprising a movable support connected to said wire, pan support means adapted to receive said force to be measured, and said vibration damping and absorbing means including resilient means connecting said pan support means to said movable support, said movable support and said pan support having adjacent sides that are generally parallel to the length and the direction of tension of said wire, and said resilient means being between and attached to said parallel sides and said force is transferred by shear stresses.

2. Apparatus according to claim 1, wherein said force receiving means further includes a pan and a resilient fiberglass pad connecting said pan support means and said pan.

3. Apparatus for measuring a force, comprising a wire, support means rigidly supporting both ends of said wire, force receiving means connected to said wire and tensioning said wire along its length, the amount of said tension being a function of said force, vibration sensor-driver means mounted adjacent said wire for sensing the frequency of vibration of said wire and for driving said wire in vibration at substantially its natural frequency, and means connected to said support and said weight receiving means for damping and absorbing vibrations, said support means having at least one cavity formed therein, and said damping and absorbing means comprising a vibration absorbing means in said cavity.

4. Apparatus as in claim 3, wherein said vibration absorbing means is sand.

5. Apparatus for measuring a force, comprising a wire, support means rigidly supporting both ends of said wire, force receiving means connected to said wire and tensioning said wire along its length, the amount of said tension being a function of said force, vibration sensor-driver means mounted adjacent said wire for sensing the frequency of vibration of said wire and for driving said wire in vibration at substantially its natural frequency, and means connected to said support and said weight receiving means for damping and absorbing vibrations, said damping and absorbing means comprising a damper connected between said support means and said force receiving means, said damper comprising a tapered piston and a mating tapered cylinder that receives said piston, and a fluid in said cylinder.

6. Apparatus for measuring a force, comprising a wire, support means rigidly supporting both ends of said wire, force receiving means connected to said wire and tensioning said wire along its length, the amount of said tension being a function of said force, and vibration sensor-driver means mounted adjacent said wire for sensing the frequency of vibration of said wire and for driving said wire in vibration at substantially its natural frequency, said vibrator sensor-driver means comprises mounting means adjacent substantially the mid-point of said wire, a light source and a light responsive device on said mounting means with said source on one side of said wire and said device on the other side of said wire, said wire crossing a path between said source and said device and alternately blocking more and less of said light path as said wire vibrates, a magnetic core on said mounting means and having at least two arms adjacent said wire, and a coil on one of said arms and establishing a magnetic circuit in said arms and in said wire when electric current flows through said coil, said vibration sensor-driven means further including drive circuit means connected to said device and to said coil and forming an oscillator loop including said wire, said device and said coil, there being a 90° phase shift between the magnetic flux of said magnetic circuit and the position of said wire when vibrating, and said drive circuit means further including 90° phase shift means for compensating for said aforementioned phase shift.

7. Apparatus as in claim 6, wherein said 90° phase shift means comprises a differentiator.

8. Apparatus as in claim 6, wherein said light responsive device comprises a phototransistor circuit that forms a current source, and said drive circuit means includes a current-to-voltage converter between said phototransistor circuit and said phase shift means.

9. Apparatus as in claim 6, wherein said drive circuit means includes a voltage-to-current converter connected between said 90° phase shift means and said coil.

10. Apparatus as in claim 9, wherein said voltage-to-current converter includes means providing a DC bias current through said coil.

* * * * *